(12) United States Patent
Li et al.

(10) Patent No.: US 8,289,573 B2
(45) Date of Patent: Oct. 16, 2012

(54) METHOD FOR REDUCING REGISTRATION DEFECTS IN COLOR PRINTING

(75) Inventors: Xing Li, Webster, NY (US); Yingjun Bai, San Jose, CA (US)

(73) Assignee: Xerox Corporation, Norwalk, CT (US)

(*) Notice: Subject to any disclaimer, the term of this patent is extended or adjusted under 35 U.S.C. 154(b) by 845 days.

(21) Appl. No.: 12/351,932

(22) Filed: Jan. 12, 2009

(65) Prior Publication Data

US 2010/0177329 A1    Jul. 15, 2010

(51) Int. Cl.
- *G06F 15/00* (2006.01)
- *G06K 9/34* (2006.01)
- *G03G 15/01* (2006.01)

(52) U.S. Cl. ........... 358/1.9; 358/1.4; 358/1.8; 358/2.1; 358/3.06; 358/514; 358/518; 358/529; 358/532; 358/534; 382/162; 382/164; 382/199; 382/232; 382/263; 382/274; 382/275; 382/287; 382/329; 399/44; 399/54; 399/38; 399/39; 399/40; 399/301; 399/372; 399/394; 347/15; 347/19; 347/43; 347/116; 347/134; 347/233

(58) Field of Classification Search .................. None
See application file for complete search history.

(56) References Cited

U.S. PATENT DOCUMENTS

| | | | |
|---|---|---|---|
| 4,149,194 A | | 4/1979 | Holladay |
| 5,097,520 A * | | 3/1992 | Bessho et al. ................ 382/172 |
| 5,243,444 A | | 9/1993 | Fan |
| 5,339,365 A | | 8/1994 | Kawai et al. |
| 5,748,770 A | | 5/1998 | Hajjahmad et al. |
| 5,841,458 A * | | 11/1998 | Kroon ........................... 347/131 |
| 6,031,327 A * | | 2/2000 | Lee ................................ 313/440 |
| 6,031,627 A * | | 2/2000 | Kakutani ....................... 358/1.9 |
| 6,650,773 B1 | | 11/2003 | Maurer et al. |
| 6,947,178 B2 | | 9/2005 | Kuo et al. |
| 7,245,397 B2 * | | 7/2007 | Yoshida ......................... 358/1.9 |
| 7,663,783 B2 * | | 2/2010 | Yamakawa ..................... 358/3.1 |
| 2004/0085591 A1 | | 5/2004 | Huang et al. |
| 2004/0091168 A1 | | 5/2004 | Jones et al. |
| 2004/0100644 A1 | | 5/2004 | Anderson |
| 2004/0109182 A1 | | 6/2004 | Nagarajan et al. |
| 2004/0135845 A1 * | | 7/2004 | Mantell ............................ 347/43 |
| 2006/0257045 A1 | | 11/2006 | McCandlish |
| 2007/0236740 A1 * | | 10/2007 | Yao ................................ 358/3.06 |
| 2008/0181092 A1 * | | 7/2008 | McClellan ..................... 369/273 |
| 2009/0021791 A1 | | 1/2009 | Ebner et al. |
| 2009/0080002 A1 | | 3/2009 | Nakano et al. |
| 2009/0109507 A1 * | | 4/2009 | Suzuki et al. ................. 358/521 |
| 2010/0177328 A1 | | 7/2010 | Li et al. |

OTHER PUBLICATIONS

Unofficial unpublished U.S. Appl. No. 11/826,893. U.S. Appl. No. 11/826,893 An Unofficial Prosecution History as of Oct. 3, 3011 for U.S. Appl. No. 11/826,893, filed Jul. 19, 2007; Published Jan. 22, 2009 as US 2009-0021791 A1 ; Inventors Ebner et al.
U.S. Appl. No. 11/826,893, filed Jul. 19, 2007; Published Jan. 22, 2009.

* cited by examiner

*Primary Examiner* — Steven Kau

(74) *Attorney, Agent, or Firm* — Michael J. Nickerson; Basch & Nickerson LLP

(57) ABSTRACT

A method and system modify a rasterized digital image to reduce registration artifacts, the image having a black plane and a color plane by determining if a pixel is part of a connected black region and if the pixel is part of a connected color region. It is determined if the pixel is part of a connected black region and a connected color region that are contiguous. A dilation operation is performed on the color plane value of the pixel if the pixel is part of a connected black region and a connected color region that are contiguous.

24 Claims, 7 Drawing Sheets

| | | | | |
|---|---|---|---|---|
| P00 | P10 | P20 | P30 | P40 |
| P01 | P11 | P21 | P31 | P41 |
| P02 | P12 | P22 | P32 | P42 |
| P03 | P13 | P23 | P33 | P43 |
| P04 | P14 | P24 | P34 | P44 |

METHOD FOR REDUCING REGISTRATION DEFECTS IN COLOR PRINTING

BACKGROUND

When printing colored documents, it is common to print black objects on a colored background. Commonly the objects are text, although the objects also may be graphic items as well. When printing black on color, it is usual to remove the color data that coincides with the black objects. In other words, a hole is created in the colored part of the image that matches the shape and size of the black object to be printed on top of the color.

In conventional printing, a defect may arise if the registration between the color part of the image and the black shifts. Since the black and color parts are not usually printed simultaneously, mechanical shifts in the printing media between the printing of the black and the color parts of the documents may give rise to such a shift.

In such a case, the black objects may have a white area adjacent thereto due to the shift of the image and possibly a darker edge as well. Such an unintended white border or darker edges are known as registration defects. The white may arise because the hole that was cut to match the black object is not exactly covered by the black object due to the unintended shift between the black and color parts. The dark edge may arise because the black is printed on top of color making the resulting image darker where the objects overlap. A variety of conventional techniques have been used to reduce or eliminate registration defects.

Many of the conventional techniques used to eliminate or reduce registration defects require extensive processing of the document to be printed as it is converted from a page description format to page images. The processing may require heavy use of the computer resources used to convert the document to page image form, thus slowing down the speed of any attached printer.

A registration defect problem may arise if the document is received by the printer already in page image form. In such a case, it is not easy to identify the black objects and the matching space in the color part of the document, since the page images are usually in raster form.

Thus, it would be desirable to find a method of correcting for registration defects that does not require extensive processing and operates on a rasterized image as opposed to the page description language stage of the document.

BRIEF DESCRIPTION OF THE DRAWING

The drawings are only for purposes of illustrating various embodiments and are not to be construed as limiting, wherein:

FIG. 5 illustrates a labeling scheme for a 5×5 neighborhood of pixels of a digital image.

DETAILED DESCRIPTION

Figure 1:
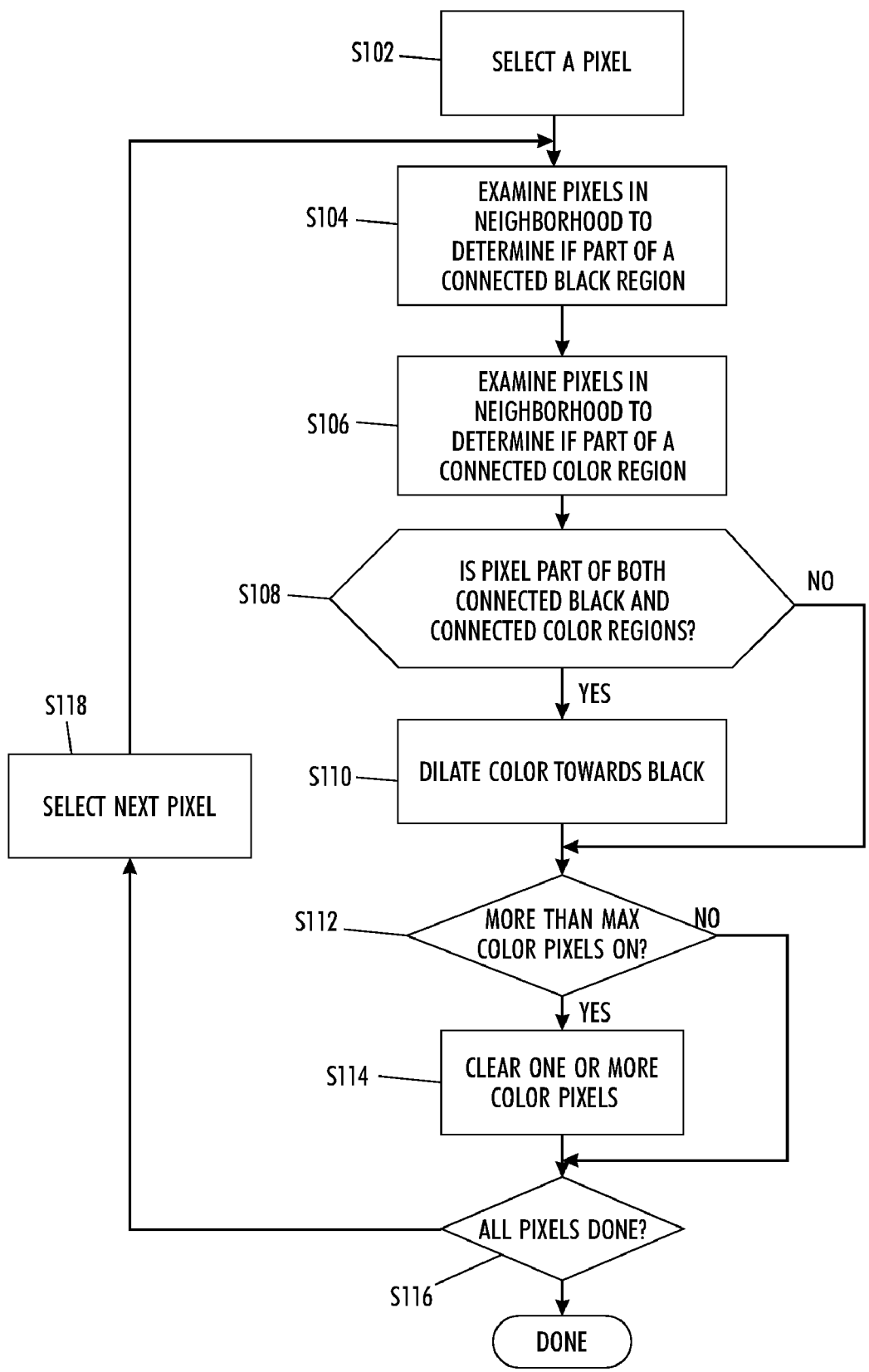
FIG. 1 illustrates a flowchart showing a method for correcting a rasterized image for trapping defects.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

Furthermore it will be recognized by those skilled in the art that the digital representation of image data may take many different forms. Pixel values may be binary, represented by a single bit, or the pixel values may be multi-bit where the pixel may take on one of a multiplicity values.

Furthermore, it is possible to represent printing values as binary where a "0" represents a non-printing pixel and a "1" represents a printing pixel. However there are also systems where a "0" represents a printing pixel and a "1" represents a non-printing pixel. Similarly, for multi-bit representations, low values may represent either lightly printing pixels or more heavily printing pixels. For the sake of simplicity of exposition, in the following descriptions a "0" represents a non-printing binary pixel and a "1" represents a printing binary pixel. Similarly, when describing a multi-bit system, an eight-bit per pixel representation, a "0" value represents non-printing, and a value of 255 represents a maximally printing pixel. It is noted that the concepts are extended to any printing value pixel bit convention.

FIG. 1 illustrates a method for correcting registration defects in a previously rasterized image. The rasterized image contains a black plane and one or more color planes. One conventional is to include three color planes, usually cyan, magenta, and yellow, with a black plane. Alternatively, the image may include black and only one other color plane if the image is a highlight color image. The image has been previously rasterized either by conversion of a page description language format or else by scanning a hardcopy page or some similar process.

In step S102, a pixel from the image is selected. In the following description, it is understood that a pixel is all the image data associated with a position that translates to all the planes, both black and color. In step S104, the pixels of the image in a neighborhood around the selected pixel are examined to determine if the selected pixel is part of a connected black region. This examination determines if the pixel is part of a larger black object and not an isolated single pixel, which might occur, for example, in a photographic-like image that is part of the page image being printed.

In step S106, the pixels of the image in a neighborhood around the selected pixel are examined to determine if the selected pixel is part of a connected color region. This examination determines if a black object is to be printed on top of or close to a colored region.

In step S108, it is determined if the selected pixel is part of both a connected black region and a connected color region that are contiguous. This analysis determines if the black pixel is likely to be part of an extended black object that is being printed on or near a colored object.

Since it is assumed that the image has had some sort of registration being applied to it, the pixel is not likely to be actually printed with black on top of a color, but if the pixel is near the edge of the black object, the pixel will be near to an extended colored object. If the pixel is not part of both regions, further operations on this pixel are skipped and control moves to step S112. However, if the pixel is part of a connected black region and a connected color region, control transfers to step S110.

In step S110, a dilation operation is performed. Dilation is a class of morphological image processing operations that alter the content of an image according to its local content. In this case, the dilation operation expands the color region. In particular, the dilation operation expands the color region towards the black object by ensuring that the pixel's color value is set to a printing value, if it was not already so set.

If the image comprises more than one color plane, the process of FIG. 1 can be repeated for each color plane. Alternatively, in some embodiments the process may be run in parallel on each color plane simultaneously. In those cases, where there is more than one color plane, the result of steps S102 through S110 may result in cases where some pixels of the image are modified in several of the color planes.

Such a case may be undesirable since it is common to limit the amount of ink or colorant that is printed in any one spot. If such a limit is desired, an optional step S112 may be added where a check is made for each pixel to determine if the number of color planes with a printing value exceeds some desired level. If the number of color planes to be printed exceeds the desired level, in optional step S114 one or more of the planes may be set back to a non-printing value. Since at least one color plane will be printed, the effect of dilating the color under the black still takes place.

Finally, in step S116, a check is made to see if all pixels in the image have been processed. If not, the next pixel is selected in step S118 and the process repeats for the newly selected pixel.

The result of the applying the process of FIG. 1 is to modify the color parts of the image that are immediately adjacent to black objects in the image. By slightly expanding the color parts of the image that are near black objects in the image, any holes that were previously made in the color part of the image under any black objects are slightly filled in so that small shifts between the black and color parts of the image are less likely to result in registration defects.

In summary, the process of FIG. 1 includes the detection of connected color and black regions, the detection of the overlap between the black and color regions, and the way to determine how to perform the dilation operation. Furthermore, it is noted that the process of FIG. 1 is applicable to a binary or multi-bit per pixel image.

For example, when the image is a binary image, both steps S104 and step S106 may include a check to see if a pixel is part of a connected black region, S104, or is part of a connected color region, S106. To perform such a check, the process may measure the density of pixels in a neighborhood around the selected pixel. This region may consist of a 3×3 or 5×5 region of pixels centered on the selected pixel. The density check may determine that not only are there a sufficient number of pixels, but that some of the pixels may be contiguous with each other and possibly with the selected pixel.

To perform the density test, the process may count the number of pixels in the neighborhood around the selected pixel whose value is "1." However, the process may give too much weight to areas where the number of pixels is high, but the pixels are separated.

Figure 2:
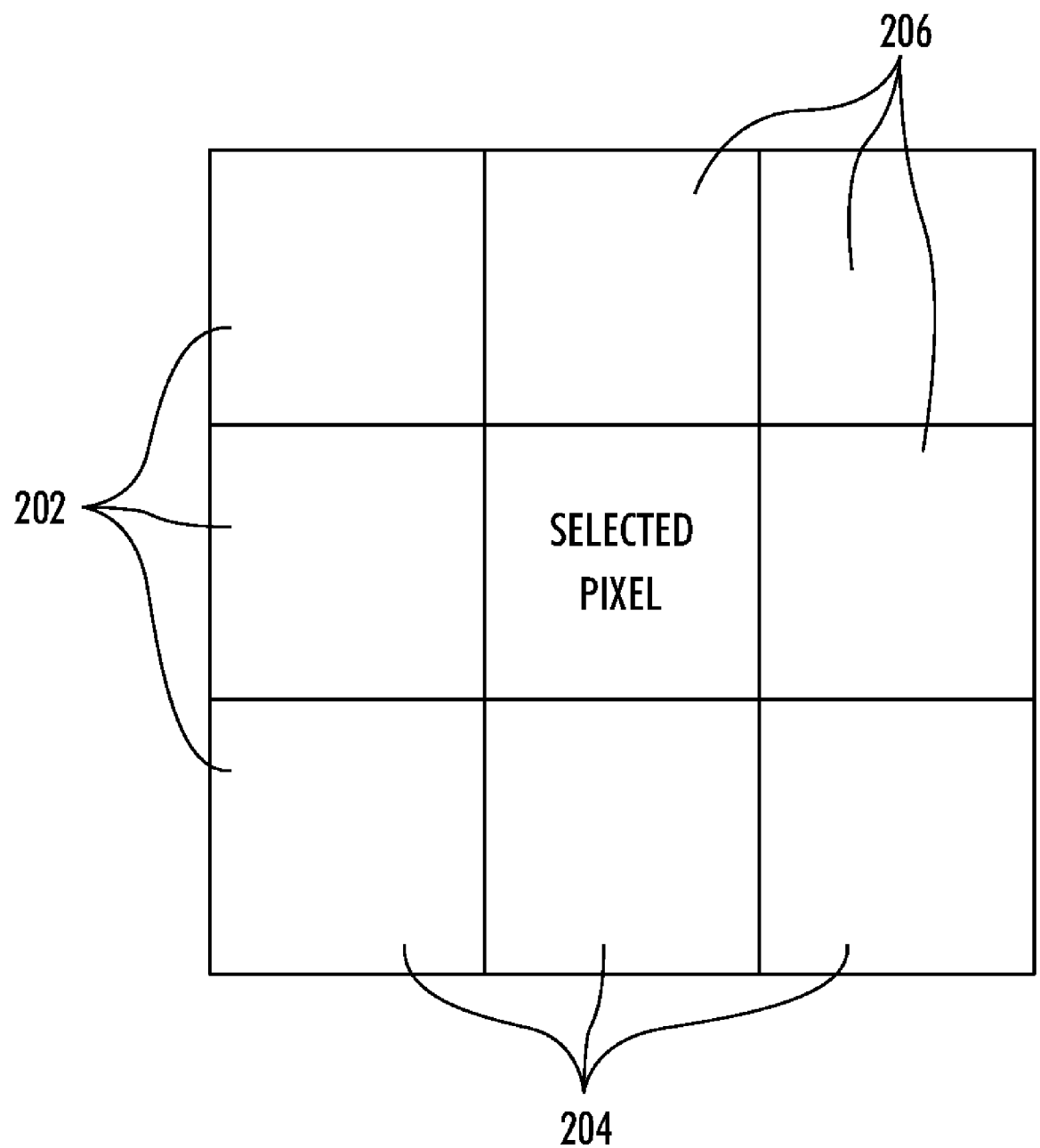
FIG. 2 shows several examples of runs in a 3×3 neighborhood of pixels.

It is also noted to perform the density test, the process may determine the number of runs of pixels in the neighborhood. A run would consist of a minimum number of adjacent pixels. FIG. 2 shows several examples of runs in a 3×3 neighborhood. For example, a run may be three pixels in a row either horizontally as 202 of FIG. 2 or vertically as in 204 of FIG. 2. A run may also include three pixels going around a corner as 206 of FIG. 2.

Figure 3:
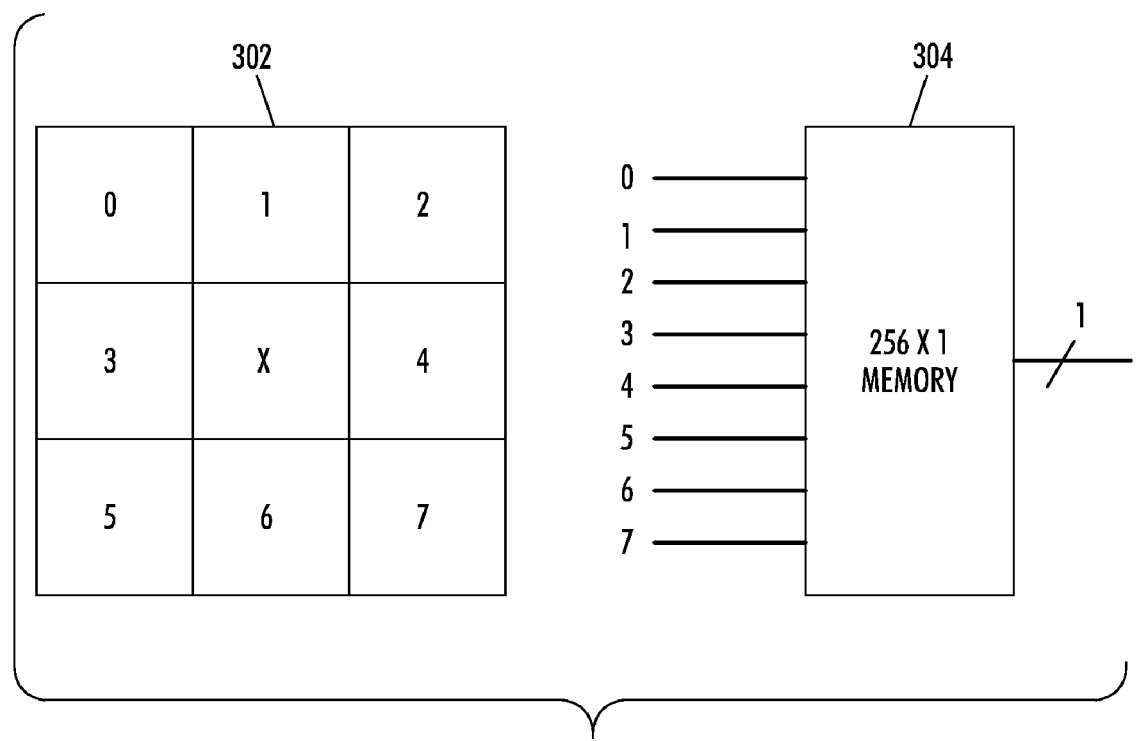
FIG. 3 illustrates a way to match image values in a 3×3 neighborhood to an address of a lookup table.

FIG. 3 shows another implementation that uses a 3×3 neighborhood around the selected pixel. The values of the eight nearest neighbors, the eight values of all of the pixels in the 3×3 neighborhood except the center pixel, can be used as the bits to address an entry in a lookup table. The entries in the table may be either "0" or "1" depending on whether the pattern of pixels that correspond to an address in the lookup table meets the density requirements.

Such a table may include all possible combinations of ON and OFF pixels in the neighborhood. Each entry may be set depending on whether or not the corresponding pattern meets a density criterion. Such a table may include not only simple runs, of say three pixels, but also more dense situation where all of the pixels are "1."

FIG. 3 illustrates a process utilizing such a lookup table. Grid 302 is a 3×3 neighborhood around the selected pixel. The numbers in each of the grid squares may correspond to an address of an entry in lookup table 304.

In the example illustrated by FIG. 3, the image is a binary image and each pixel in the neighborhood surrounding the selected pixel represents a bit of the address corresponding to an entry in the lookup table 304. The exact order of feeding the pixel values to the lookup table 304 is dependent upon the entry structure within the lookup table 304.

In the example illustrated in FIG. 3, the upper left hand pixel value sets the most significant bit of the address the lookup table 304. The addressing continues across and down the grid until the lower right hand pixel value sets the least significant bit of the address of the lookup table 304.

Figure 4:
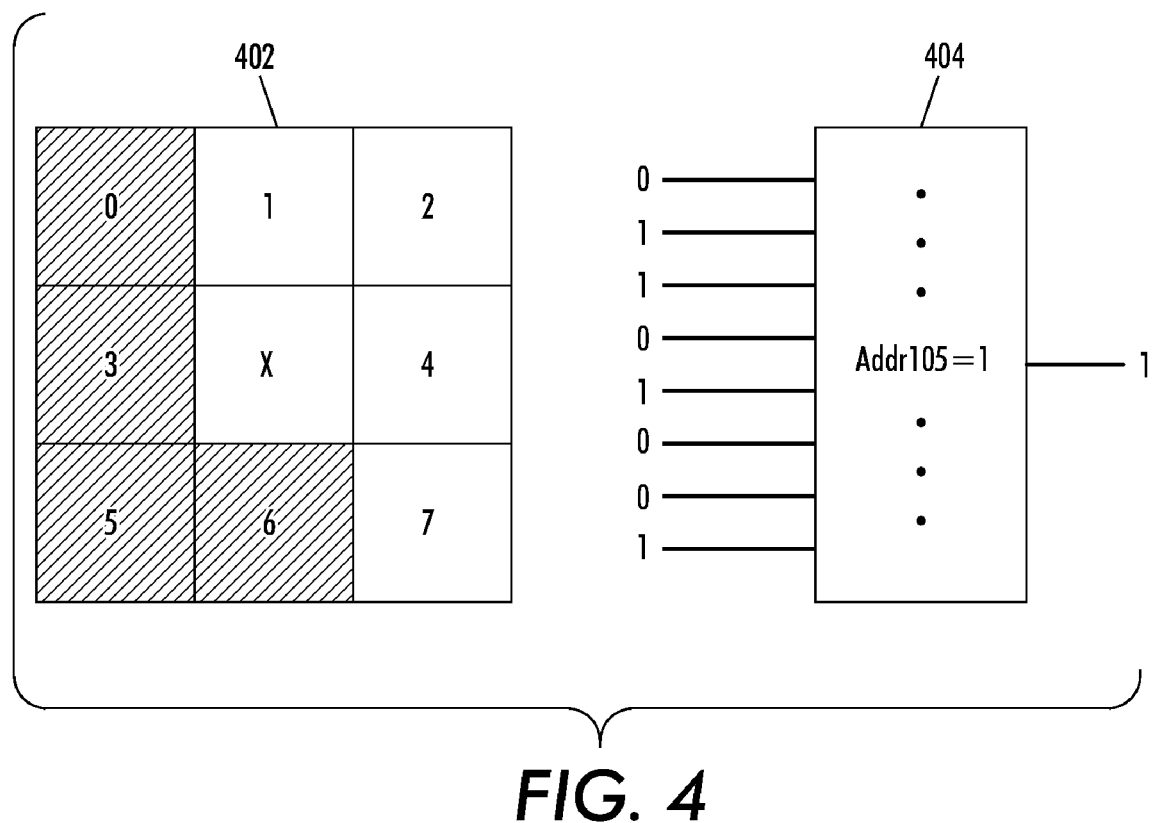
FIG. 4 illustrates a specific example of the lookup table addressing of FIG. 3.

In FIG. 4, another example of a lookup table is illustrated. The grid squares of neighborhood 402, which are shaded, correspond to pixels that are printing (in this example "1"), while the unshaded pixels correspond to non-printing pixels (in this example "0"). Block 404 represents a lookup table with each grid square contributing one bit to the address input to the lookup table 404. As illustrated in FIG. 4, the pattern shown in grid 402 corresponds to an address value of 105. As illustrated, lookup table 404, in response to an entry address of 105, outputs a value of "1" indicating that the pattern in grid 402 corresponds to a neighborhood configuration that meets the density criterion or the density threshold.

As discussed above, step S108 of FIG. 1, with respect to a binary image, determines if the pixel is part of a connected black region and a connected color region, both of which are contiguous. The requirement of contiguity ensures that any black pixels are on or near a color region where registration defects may occur.

It is noted that the determination of the contiguity of the two regions may be realized by performing a logical "OR" operation on the color and black pixels in some neighborhood around the selected pixel. This neighborhood may be a 3×3 region or a 5×5 region. After performing the logical "OR" operation, a count may be made of the non-printing pixels. By ensuring that this count is equal to or less than some predetermined value, a measure of contiguity can be made.

It is noted that the contiguity criterion may also include counting the number of printing pixels in a neighborhood in both the color and black planes and then checking to see that the combined printing pixel count equals or exceeds some threshold.

The dilation operation for binary images may set the color value of the pixel being tested to a "1" value. This ensures that color is printed at that pixel location, thereby reducing or eliminating the registration defect.

The decision as to whether or not to perform the dilation operation, as illustrated in FIG. 1, may use multiple criteria. For example, more than one of the tests described above may be combined to increase the possibility of correctly identifying a part of the image that needs to have a registration defect correction applied. With respect to utilizing multiple criteria, the operations, associated with each criterion, may be performed in parallel or serial.

It is noted that the dilation operation may not be limited to the selected pixel. More specifically, the dilation operation may be extended to the selected pixel and a predetermined number of pixels adjacent to the selected pixel. Moreover, the dilation operation may be extended to the selected pixel and a predetermined number of pixels adjacent to the selected pixel in a predetermined direction.

With respect to multi-bit images, the criteria for connectedness and contiguity may be different than from those for binary images because the pixels may have multiple values. There are a variety of ways in which images can be represented by multiple bits per pixel.

In the discussions below, for a system using an eight-bits per pixel representation, a 0 value represents non-printing, and a value of 255 represents a maximum printing pixel value.

One example of performing the density measurement of step S104, for a multi-bit pixel, is to examine the black value of the pixel. If the black value of the pixel is above a predetermined threshold value, the pixel is likely to be part of a connected black region.

Another example to perform the density measurement is to compute the maximum value of the pixels in a neighborhood, such a 3×3 or 5×5 neighborhood, around the pixel.

Another example to perform the density measurements in steps S104 or S106 of FIG. 1 is to calculate the average value of the pixels in a neighborhood, such a 3×3 or 5×5 neighborhood, around the selected pixel. For example, if a 3×3 neighborhood is chosen, the average would be over the eight nearest neighbors. If the average density is above some predetermined threshold value, the average density can be considered as an indicator that the selected pixel is part of a connected region, either color or black.

If the color value of the pixel is less than or equal to a predetermined threshold value, and the black and color densities also meet the adopted criteria, the color value of the pixel can be replaced by the average of the color values in the neighborhood of the pixel.

A density measurement that is combined with the contiguity condition is shown in FIG. 5. In the example illustrated by FIG. 5, grid 502 represents the twenty-five pixels in a 5×5 neighborhood around the pixel being tested. The entries in each cell of grid 502 are indices labeling each pixel.

As illustrated in FIG. 5, both a 3×3 neighborhood and a 5×5 neighborhood centered on the pixel of interest are examined. For each of the corner pixels of the 3×3 neighborhood, the black value is compared to a predetermined threshold. If the black value of the pixel is equal or greater than a predetermined threshold, the color value of the diagonally adjacent pixel is recorded. If the black value fails to be equal or exceed the threshold value, a zero is recorded instead. The maximum of the four corner values is determined and used as a correction value for the color value of the center pixel.

Referring to FIG. 5, pixel P11 will be used as an example. The black value of the pixel is compared to a predetermined threshold. If the black value is equal to or greater than the threshold, the color value of pixel P00 is recorded. If the black value is less than the threshold, a zero is recorded. This procedure is repeated for pixel P31, using the color value of pixel P40; for pixel P13, using the color value of P04; and finally for pixel P33, using the color value of P44.

Figure 6:
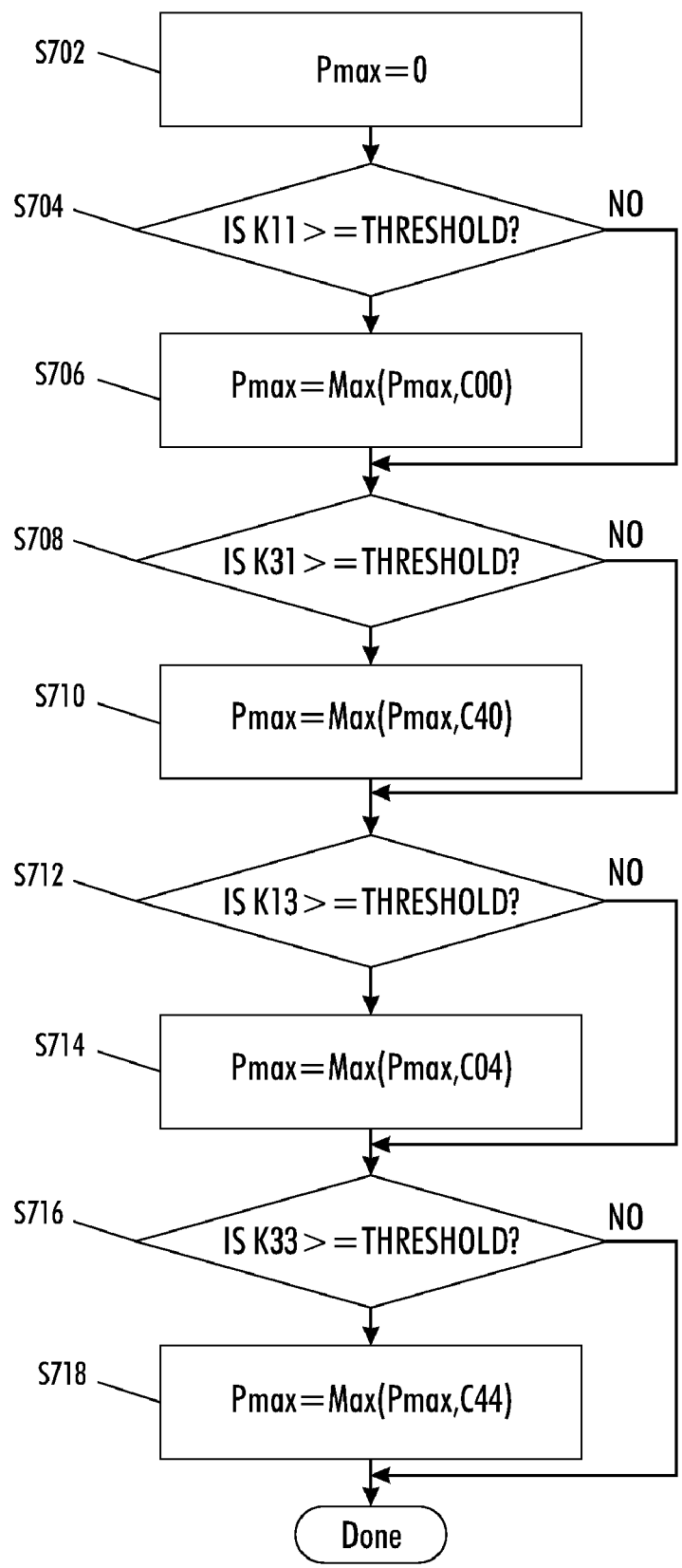
FIG. 6 illustrates a method for determining a density value for a neighborhood around a selected pixel.

FIG. 6 illustrates a flowchart showing the process described above with respect to FIG. 5. In step S702, the value to be generated, $P_{max}$, is set to zero as a starting value. In step S704, the black value of pixel P11 of FIG. 5, K11, is compared to a threshold. If the black value of pixel P11 of FIG. 5, K11, exceeds the threshold, in step S706, the value of $P_{max}$ is set to the larger of its current value, the color value of pixel P00 of FIG. 5, the color value of pixel P13 of FIG. 5, or the color value of pixel P33 of FIG. 5. At the completion of the process, the value of $P_{max}$ is now equal to either 0 or the largest corner value. The value of $P_{max}$ will be used in the dilation operation as described below.

The dilation operation for multiple bit images involves adding to the color value of the pixel being tested. The amount to be added may be determined as part of the contiguity or connectedness tests described above. Furthermore, it may be useful to add a constant correction value. The final corrected value can be added to or replace the color value of the pixel under test.

Finally, for multi-bit images, it is also possible that the image is represented at one level of bit depth but that the actual printing is done at another, usually higher, level of bit depth.

For example, the image may be represented as 4 bits per pixel per black or color while the print engine uses a full 8 bits per pixel representation. In such cases, the testing may be carried out at the lower bit depth and at the end the corrected value can be converted to the full printing level of bit depth. Alternatively, the pixel values can be first converted to the printing bit depth and all tests and corrections carried out at that bit depth.

In another example, a 2-pixel binary registration correction operation will be described for a binary image. In this example, a cyan color plane will be utilized as an example of the process to be executed for all the appropriate color planes.

With respect to the cyan plane, a first determination determines if the number of cyan plane pixels, within a predetermined neighborhood of pixels around a selected pixel, which represent a printing mark wherein the corresponding black plane pixel represents a non-printing mark is greater than a predetermined color value neighborhood threshold. Moreover, a second determination determines if the number of black plane pixels, within the predetermined neighborhood of pixels around the selected pixel, which represent a printing mark is greater than a predetermined black value neighborhood threshold. A third determination determines if the sum of the number of cyan plane pixels, within a predetermined neighborhood of pixels around the selected pixel, which represent a printing mark wherein the corresponding black plane pixel represents a non-printing mark and the number of black plane pixels, within the predetermined neighborhood of pixels around the selected pixel, which represent a printing mark is greater than a predetermined neighborhood threshold.

A fourth determination determines if the black plane pixel of the selected pixel represents a printing mark. A fifth determination determines if the black plane pixels of a second predetermined neighborhood of pixels around the selected pixel meet a predetermined black density criterion. A sixth determination determines if the cyan plane pixels of the second predetermined neighborhood of pixels around the selected pixel meet a predetermined cyan density criterion. A seventh determination determines if the number of black plane pixels, within the second predetermined neighborhood of pixels around the selected pixel, which represent a printing mark is greater than a second predetermined black value neighborhood threshold. An eighth determination determines if the cyan plane pixel of the selected pixel represents a non-printing mark.

If the first, second, third, fourth, fifth, sixth and eighth determinations are satisfied, and a 2-pixel dilation operation has been selected, the value for the cyan plane pixel of the selected pixel is changed to represent a printing mark.

If the first, second, third, fourth, sixth, seventh, and eighth determinations are satisfied, and a 2-pixel dilation operation has been selected, the value for the cyan plane pixel of the selected pixel is changed to represent a printing mark.

If the first, second, third, fourth, fifth, sixth, and eighth determinations are satisfied, and a 2-pixel dilation operation has not been selected, the value for the cyan plane pixel of the selected pixel is changed to represent a printing mark.

Moreover, it is noted that the above determinations may be performed for each color plane such that the value for the color plane pixel of the selected pixel is changed to represent a printing mark if the appropriate determinations noted above are satisfied.

It is noted that the process may be modified such that if all the values for all the color plane pixel of the selected pixel have been changed to represent a printing mark, the process changes all the values for all the color plane pixel of the selected pixel to represent a non-printing mark.

In a further example, a 2-pixel binary registration correction operation will be described for a multi-bit (four-bit) image. In this example, a cyan color plane will be utilized as an example of the process to be executed for all the appropriate color planes.

With respect to the cyan plane, a first determination determines the maximum cyan plane pixel value within a predetermined neighborhood of pixels around a selected pixel. Moreover, utilizing the process illustrated in FIG. 6, a second determination determines the maximum cyan plane pixel value of the four corner cyan plane pixels.

If a 2-pixel dilation operation has not been selected, the cyan value to be added to the selected pixel is determined to be the maximum cyan plane pixel value within a predetermined neighborhood of pixels around a selected pixel.

If a 2-pixel dilation operation has been selected, the cyan value to be added to the selected pixel is determined to be the maximum of either the maximum cyan plane pixel value within a predetermined neighborhood of pixels around a selected pixel or the maximum cyan plane pixel value of the four corner cyan plane pixels.

A third determination determines if the black plane pixel of the selected pixel is greater than a predetermined black value threshold. A fourth determines if the cyan plane pixel of the selected pixel represents a non-printing mark. A fifth determination determines if each black plane pixel within the predetermined neighborhood of pixels around a selected pixel is greater than a predetermined high black value threshold or less than a predetermined low black value threshold.

If the third, fourth, and fifth determinations are satisfied, the cyan value to be added to the selected pixel is added to the cyan plane pixel of the selected pixel.

Moreover, it is noted that the above determinations may be performed for each color plane such that the value for the color plane pixel of the selected pixel is changed to represent a printing mark if the appropriate determinations noted above are satisfied.

The above methods may be implemented as software controlling a general purpose computing device. However, it will be easily recognized by those skilled in the art, that the methods described above are well suited to hardware implementation. Devices, such as custom ASICs or FPGAs, may be used to implement the processes described herein.

Hardware implementations may perform one or more of the individual steps of the process in parallel as opposed to serially. For example, the process of FIG. 1 shows the check for a connected black region being performed first, followed by a test for a connected color region and then a third test for the contiguity of the two regions. In a hardware implementation, the three tests may be performed in parallel rather than serially.

Figure 7:
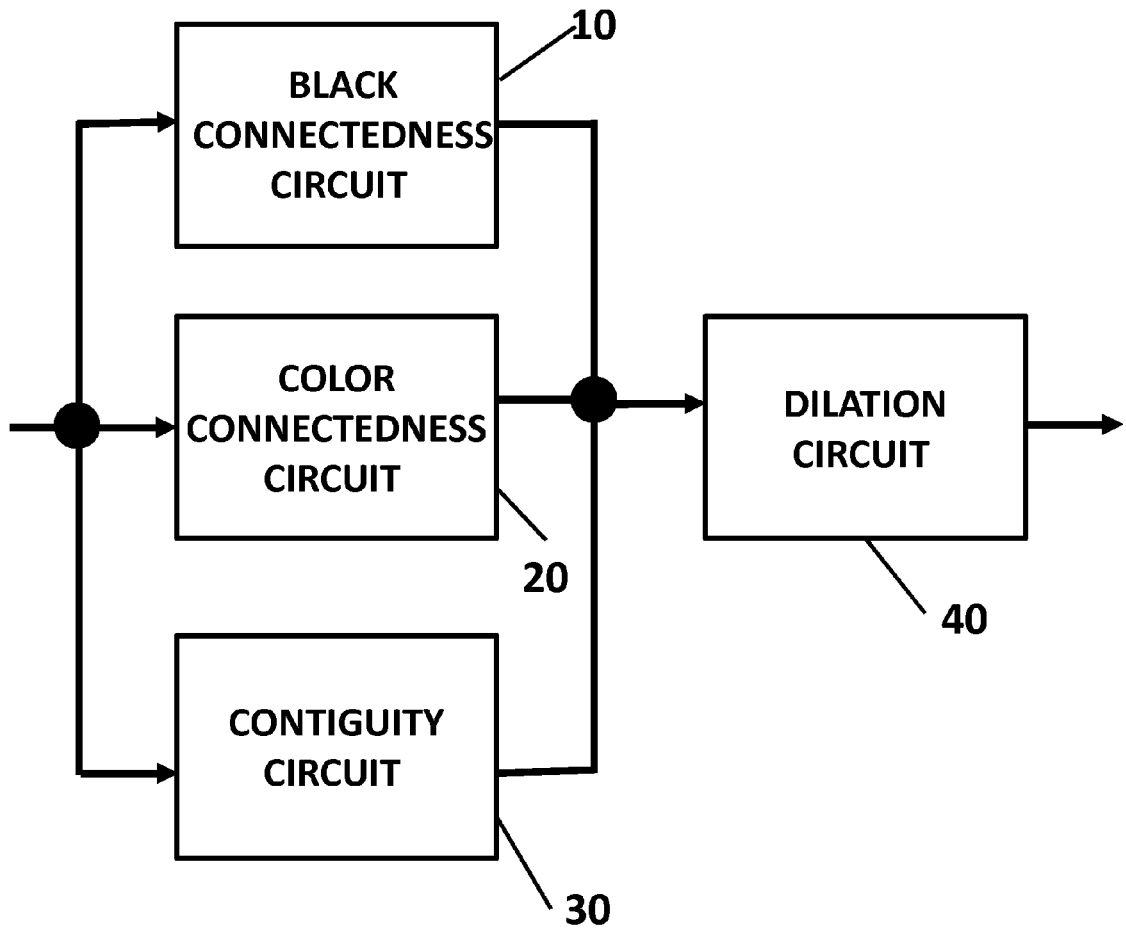
FIG. 7 illustrates a block diagram showing circuitry for correcting a rasterized image for trapping defects.

FIG. 7 illustrates circuitry that modifies a rasterized digital image to reduce registration defects wherein the image has a black plane and a color plane. As illustrated in FIG. 7, a black connectedness circuit 10 determines if each pixel in the image is part of a connected black region, and a color connectedness circuit 20 determines if each pixel is part of a connected color region. A contiguity circuit 30 determines if each pixel is part of a connected black region and a connected color region that are contiguous, and a dilation circuit 40, which is operatively connected to the black connectedness circuit 10, the color connectedness circuit 20, and the contiguity circuit 30. The dilation circuit 40 alters the color plane value of the pixel in response to the outputs of the black connectedness circuit 10, the color connectedness circuit 20, and the contiguity circuit 30.

The dilation circuit 40 determines that in a first neighborhood around the pixel that the number of pixels where the color value results in printing a mark on an output medium and the black value results in not printing a mark on the output medium exceeds a first threshold; determines that in the first predefined neighborhood of the pixel the sum of the number of pixels with a color value results in printing a mark on the output medium and the number of pixels with a black value results in not printing a mark on the output medium exceeds a second predetermined threshold; and determines that the color value of the pixel results in not printing a mark on the output medium.

The dilation circuit 40 sets the color value of the pixel to one that results in printing a mark on the output medium.

In summary, method and system modifying a rasterized digital image to reduce registration artifacts, the image having a black plane and a color plane, by electronically determining if a pixel is part of a connected black region; electronically determining if the pixel is part of a connected color region; electronically determining if the pixel is part of a connected black region and a connected color region that are contiguous; and electronically performing a dilation operation on the color plane value of the pixel if the pixel is part of a connected black region and a connected color region that are contiguous.

It is noted that the image may comprises more than one color plane. It is further noted that the determination of if the pixel is part of a connected black region may determine if the pixel has a black value that results in printing a mark on an output medium and/or may determine if a density of pixels whose black value results in printing a mark on the output medium in a predefined region around the pixel exceeds a predefined threshold.

It is also noted that the determination of if the pixel is part of a connected color region may determine if a density of pixels whose color value results in printing a mark on an output medium in a first predefined region around the pixel exceeds a predefined threshold.

The performing of a dilation operation on the pixel's color plane value if the pixel is part of a connected black region and a connected color region that are contiguous may determine if a color value of the pixel results in not printing a mark on an output medium; determine if a number of pixels in a second predefined region around the pixel where both the pixel's color value results in not printing a mark on the output medium and the pixel's black value results in not printing a mark on the output medium is below a predefined threshold; and/or change a color value of the pixel to a value that results in printing a mark on the output when it is determined that the number of pixels in a second predefined region around the pixel where both the pixel's color value results in not printing a mark on the output medium and the pixel's black value results in not printing a mark on the output medium is below a predefined threshold.

The determination of if the pixel is part of a connected black region may determine if the pixel has a black value results in printing a mark on an output medium; determine if a number of pixels with a black value that results in printing a mark on the output medium in a first predefined neighborhood of the pixel equals or exceeds a first predefined threshold; determine if a number of pixel black values that result in printing a mark on the output medium in a second, smaller, predefined neighborhood of the chosen pixel equal or exceeds a second predefined threshold; and/or determine if a density of pixels in the second predefined neighborhood exceeds a third predefined threshold.

The determination of the density of pixels in the second predefined neighborhood may use a lookup table wherein the bits of the number comprising the entry to the lookup table is composed of the pixel values of the black pixels in the second predefined neighborhood. Also, the determination of if the pixel is part of a connected color region may determine if a density of pixels whose color value results in printing a mark on the output medium in a predefined neighborhood around the pixel exceeds a predefined threshold.

A method and system modify a multi-bit rasterized digital image to reduce registration artifacts, the image having a black plane and a color plane, by electronically determining if a pixel is part of a connected black region by determining that if the current pixel value has a predetermined relationship with respect to a predetermined value; electronically determining if the pixel is part of a connected color region by determining that the average color value of a predetermined number of nearest neighbors of the pixel has a predetermined relationship with respect to a predetermined value; electronically determining if the pixel is part of a connected black region and a connected color region that are contiguous; and electronically performing a dilation operation on the color plane value of the pixel if the pixel is part of a connected black region and a connected color region that are contiguous.

The performing of a dilation operation on the pixel's color value further may determine if a color value of the pixel is below a predetermined printing density value and/or set the color value of the pixel to the average color value of a predetermined number of nearest neighbors of the selected pixel when it is determined that the color value of the pixel is below a predetermined printing density value. Also, the performing of a dilation operation on the pixel's color value further may determine if a color value of the pixel corresponds to a maximum printing density value and/or set the color value of the selected pixel to the average color value of a predetermined number of nearest neighbors of the selected pixel when it is determined that the color value of the pixel does not correspond to a maximum printing density value.

The determination of if the pixel is part of a connected black region may determine if the black value of the pixel exceeds a first threshold value and/or determine if the black value of each of a predetermined number of nearest neighboring pixels of the pixel either equals or exceeds a second threshold value. Also, the determination of if the pixel is part of a connected black region may determine if the black value of the pixel is equal to or less than a first threshold value and/or determine if the black value of each of a predetermined number of nearest neighboring pixels of the pixel is either equal to or less than a second threshold value.

The performing of a dilation operation on the pixel's color plane value if the pixel is part of a connected black region and a connected color region that are contiguous may combine the maximum color value of the color values of a predetermined number of nearest neighboring pixels of the pixel with a predetermined adjustment amount and modifying the color value of the pixel based on the combined value and/or combine the minimum color value from the color values of a predetermined number of nearest neighboring pixels of the pixel and a predetermined adjustment value and modifying the color value of the pixel value of based on the combined value.

The determination of if the pixel is part of a connected color region may select a set of neighboring pixels around the selected pixel; determine, for each of the selected neighboring pixels, if the black value thereof equals or exceeds a predetermined threshold value, and if it equals or exceeds the threshold value recording the color value of one of the selected pixel's neighbors, otherwise recording zero; and/or determine, for each of the selected neighboring pixels, if the black value thereof equals or is less than a predetermined threshold value, and if it equals or exceeds the threshold recording the color value of one of the pixel's neighbors, otherwise recording a maximum value.

The performing of a dilation operation on the selected pixel's color plane value if the pixel is part of a connected black region and a connected color region that are contiguous may combine the recorded color value and a predetermined adjustment amount and modifying pixel's color value based on the combined value and/or combine the recorded color value and a predetermined adjustment amount and modifying pixel's color value based on the combined value.

A method and method modify a rasterized digital image to reduce registration artifacts, the image having a black plane and a color plane, by electronically determining if a pixel is part of a connected black region; electronically determining if the pixel is part of a connected color region; electronically determining if the pixel is part of a connected black region and a connected color region that are contiguous; electronically performing a dilation operation on the color plane value of the pixel if the pixel is part of a connected black region and a connected color region that are contiguous; electronically determining, in a first neighborhood around the pixel, if a number of pixels where the color value results in printing a mark on an output medium and a number of pixels where the black value results in not printing a mark on the output medium exceeds a first threshold; electronically determining, in the first predefined neighborhood of the pixel, a sum of the number of pixels with a color value results in printing a mark on the output medium and the number of pixels with a black value results in not printing a mark on the output medium exceeds a second predetermined threshold; electronically determining if a color value of the pixel results in not printing a mark on the output medium; and electronically setting the color value of the pixel to a value that results in printing a mark on the output medium when the sum of the number of pixels with a color value results in printing a mark on the output medium and the number of pixels with a black value results in not printing a mark on the output medium exceeds a second predetermined threshold.

It is noted that the method and system may electronically determine if an extended dilation operation is to be performed; electronically determine, in a first neighborhood around the pixel, if a number of pixels where the color value results in printing a mark on an output medium and the black value results in not printing a mark on the output medium exceeds a first threshold; electronically determine, in the first predefined neighborhood of the pixel, a sum of the number of pixels with a color value results in printing a mark on the output medium and the number of pixels with a black value results in printing a mark on the output medium exceeds a second predetermined threshold; electronically determine if a color value of the pixel results in not printing a mark on the output medium; electronically determine if, from a predetermined number of nearest neighbors of the pixel, a predetermined number of the nearest neighbors have a black value that results in printing a mark on the output medium; and/or electronically set a color value of the pixel to a value that results in printing a mark on the output medium when it is determined that a predetermined number of the nearest neighbors have a black value that results in printing a mark on the output medium.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of using an electronic apparatus to modify a rasterized digital image to reduce registration artifacts, the image having a black plane and a color plane, comprising:
   electronically determining if a pixel is part of a connected black region;
   electronically determining if the pixel is part of a connected color region;
   electronically determining if the pixel is part of a connected black region and a connected color region that are contiguous; and
   electronically performing a dilation operation on the color plane value of the pixel, to expand the color region, if the pixel is part of a connected black region and a connected color region that are contiguous.

2. The method of claim 1, wherein the performing of the dilation operation on the color plane value of the pixel comprises:
   electronically performing a dilation operation on the color plane value of the pixel and a predetermined number of adjacent pixels.

3. The method of claim 1, wherein the determination of the pixel being part of a connected black region further comprises:
   determining if the pixel has a black value that results in printing a mark on an output medium; and
   determining if a density of pixels whose black value results in printing a mark on the output medium in a predefined region around the pixel exceeds a predefined threshold.

4. The method of claim 1, wherein the determination of the pixel being part of a connected color region further comprises:
   determining if a density of pixels whose color value results in printing a mark on an output medium in a first predefined region around the pixel exceeds a predefined threshold.

5. The method of claim 1, wherein the performing of the dilation operation on the color plane value of the pixel comprises:
   determining if a color value of the pixel results in not printing a mark on an output medium;
   determining if a number of pixels in a second predefined region around the pixel where both the pixel's color value results in not printing a mark on the output medium and the pixel's black value results in not printing a mark on the output medium is below a predefined threshold; and
   changing a color value of the pixel to a value that results in printing a mark on the output when it is determined that the number of pixels in a second predefined region around the pixel where both the pixel's color value results in not printing a mark on the output medium and the pixel's black value results in not printing a mark on the output medium is below a predefined threshold.

6. The method of claim 1, wherein the determination of the pixel being part of a connected black region further comprises:
   determining if the pixel has a black value results in printing a mark on an output medium;
   determining if a number of pixels with a black value that results in printing a mark on the output medium in a first predefined neighborhood of the pixel equals or exceeds a first predefined threshold;
   determining if a number of pixel black values that result in printing a mark on the output medium in a second, smaller, predefined neighborhood of the chosen pixel equal or exceeds a second predefined threshold; and
   determining if a density of pixels in the second predefined neighborhood exceeds a third predefined threshold.

7. The method of claim 6, wherein the determination of the density of pixels in the second predefined neighborhood comprises:
   using a lookup table wherein the bits of the number comprising the entry to the lookup table is composed of the pixel values of the black pixels in the second predefined neighborhood.

8. The method of claim 1, wherein the determination of the pixel being part of a connected color region comprises:
   determining if a density of pixels whose color value results in printing a mark on the output medium in a predefined neighborhood around the pixel exceeds a predefined threshold.

9. A system that modifies a rasterized digital image to reduce registration defects, the image having a black plane and a color plane, comprising:
   a black connectedness circuit to determine if each pixel in the image is part of a connected black region;
   a color connectedness circuit to determine if each pixel is part of a connected color region;
   a contiguity circuit to determine if each pixel is part of a connected black region and a connected color region that are contiguous; and
   a dilation circuit, operatively connected to said black connectedness circuit, said color connectedness circuit, and said contiguity circuit, alter the color plane value of the pixel, to expand the color region, in response to said contiguity circuit determining that the pixel is part of a connected black region and a connected color region that are contiguous.

10. The system of claim 9, wherein the image includes more than one color plane.

11. The system of claim 9, wherein said black connectedness circuit determines if the pixel has a black value that results in printing a mark on an output medium and determines if the density of pixels whose black value results in printing a mark on the output medium in a predefined region around the pixel exceeds a predefined threshold.

12. The system of claim 9, wherein said black connectedness circuit determines if the density of pixels whose color value results in printing a mark on an output medium in a first predefined region around the pixel exceeds a predefined threshold.

13. The system of claim 9, wherein said dilation circuit determines if a color value of the pixel results in not printing a mark on an output medium;
determines if the number of pixels in a second predefined region around the pixel where both the pixel's color value results in not printing a mark on the output medium and the pixel's black value results in not printing a mark on the output medium is below a predefined threshold; and
changes a color value of the pixel to a value that results in printing a mark on the output medium.

14. The system of claim 9, wherein said black connectedness circuit determines that the pixel has a black value results in printing a mark on an output medium;
determines that number of pixels with a black value that results in printing a mark on the output medium in a first predefined neighborhood of the pixel equals or exceeds a first predefined threshold;
determines that the number of pixel black values that result in printing a mark on the output medium in a second, smaller, predefined neighborhood of the chosen pixel equal or exceeds a second predefined threshold; and
determines that the density of pixels in the second predefined neighborhood exceeds a third predefined threshold.

15. The system of claim 14, wherein said black connectedness circuit utilizes a lookup table to determine the density of pixels in the second predefined neighborhood wherein the bits of the number comprising the entry to the lookup table is composed of the pixel values of the black pixels in the second predefined neighborhood.

16. The system of claim 9, wherein said color connectedness circuit determines if the density of pixels whose color value results in printing a mark on the output medium in a predefined neighborhood around the pixel exceeds a predefined threshold.

17. A method of using an electronic apparatus to modify a rasterized digital image to reduce registration artifacts, the image having a black plane and a color plane, comprising:
electronically determining if a pixel is part of a connected black region;
electronically determining if the pixel is part of a connected color region;
electronically determining if the pixel is part of a connected black region and a connected color region that are contiguous; and
electronically performing a dilation operation on the color plane value of the pixel, to expand the color region, if the pixel is part of a connected black region and a connected color region that are contiguous;
said dilation operation including,
electronically determining, in a first neighborhood around the pixel, if a number of pixels where the color value results in printing a mark on an output medium and a number of pixels where the black value results in not printing a mark on the output medium exceeds a first threshold,
electronically determining, in the first predefined neighborhood of the pixel, a sum of the number of pixels with a color value results in printing a mark on the output medium and the number of pixels with a black value results in not printing a mark on the output medium exceeds a second predetermined threshold,
electronically determining if a color value of the pixel results in not printing a mark on the output medium, and
electronically setting the color value of the pixel to a value that results in printing a mark on the output medium when the sum of the number of pixels with a color value results in printing a mark on the output medium and the number of pixels with a black value results in not printing a mark on the output medium exceeds a second predetermined threshold.

18. The method of claim 17, wherein said dilation operation electronically determines if an extended dilation operation is to be performed by electronically determining if, from a predetermined number of nearest neighbors of the pixel, a predetermined number of the nearest neighbors have a black value that results in printing a mark on the output medium;
said dilation operation electronically setting a color value of the pixel to a value that results in printing a mark on the output medium when it is determined that a predetermined number of the nearest neighbors have a black value that results in printing a mark on the output medium.

19. A system that modifies a rasterized digital image to reduce registration defects, the image having a black plane and a color plane, comprising:
a black connectedness circuit to determine if each pixel in the image is part of a connected black region;
a color connectedness circuit to determine if each pixel is part of a connected color region;
a contiguity circuit to determine if each pixel is part of a connected black region and a connected color region that are contiguous;
a dilation circuit, operatively connected to said black connectedness circuit, said color connectedness circuit, and said contiguity circuit, to alter the color plane value of the pixel, to expand the color region, in response to the outputs of said black connectedness circuit, said color connectedness circuit, and said contiguity circuit;
said dilation circuit determining that in a first neighborhood around the pixel that the number of pixels where the color value results in printing a mark on an output medium and the black value results in not printing a mark on the output medium exceeds a first threshold;
said dilation circuit determining that in the first predefined neighborhood of the pixel the sum of the number of pixels with a color value results in printing a mark on the output medium and the number of pixels with a black value results in not printing a mark on the output medium exceeds a second predetermined threshold; and
said dilation circuit determining that the color value of the pixel results in not printing a mark on the output medium;
said dilation circuit setting the color value of the pixel to one that results in printing a mark on the output medium.

20. The system of claim 19, wherein said dilation circuit determines if an extended dilation operation is to be performed by determining if, from a predetermined number of nearest neighbors of the pixel, a predetermined number of the nearest neighbors have a black value that results in printing a mark on the output medium;
said dilation circuit setting a color value of the pixel to a value that results in printing a mark on the output medium when it is determined that a predetermined number of the nearest neighbors have a black value that results in printing a mark on the output medium.

21. A method of using an electronic apparatus to modify a multi-pixel binary rasterized digital image to reduce registration artifacts, the image having a black plane and a color plane, comprising:
(a) electronically determining if a number of first color plane pixels, within a predetermined neighborhood of pixels around a selected pixel, which represent a printing mark wherein the corresponding black plane pixel represents a non-printing mark is greater than a predetermined first color value neighborhood threshold;
(b) electronically determining if a number of black plane pixels, within the predetermined neighborhood of pixels around the selected pixel, which represent a printing mark is greater than a predetermined black value neighborhood threshold;
(c) electronically determining if a sum of the number of cyan plane pixels, within a predetermined neighborhood of pixels around the selected pixel, which represent a printing mark wherein the corresponding black plane pixel represents a non-printing mark and the number of black plane pixels, within the predetermined neighborhood of pixels around the selected pixel, which represent a printing mark is greater than a predetermined neighborhood threshold;
(d) electronically determining if the black plane pixel of the selected pixel represents a printing mark;
(e) electronically determining if the black plane pixels of a second predetermined neighborhood of pixels around the selected pixel meet a predetermined black density criterion;
(f) electronically determining if the first color plane pixels of the second predetermined neighborhood of pixels around the selected pixel meet a predetermined first color density criterion;
(g) electronically determining if the number of black plane pixels, within the second predetermined neighborhood of pixels around the selected pixel, which represent a printing mark is greater than a second predetermined black value neighborhood threshold;
(h) electronically determining if the first color plane pixel of the selected pixel represents a non-printing mark;
(i) electronically determining if a multi-pixel dilation operation has been selected; and
(j) electronically changing a value for the first color plane pixel of the selected pixel, to expand the color region, to represent a printing mark when (a), (b), (c), (d), (e), (f), (h), and (i) are satisfied.

22. The method as claimed in claim 21, further comprising:
(k) changing a value for the first color plane pixel of the selected pixel to represent a printing mark when (a), (b), (c), (d), (f), (g), (h), and (i) are satisfied.

23. The method as claimed in claim 21, further comprising:
(l) changing a value for the first color plane pixel of the selected pixel to represent a printing mark when (a), (b), (c), (d), (e), (f), and (h) are satisfied.

24. A method of using an electronic apparatus to modify a multi-pixel multi-bit rasterized digital image to reduce registration artifacts, the image having a black plane and a color plane, comprising:
(a) determining a maximum first color plane pixel value within a predetermined neighborhood of pixels around a selected pixel;
(b) determining a maximum cyan first color pixel value of four corner first color plane pixels wherein the four corner first color plane pixels are pixels diagonally adjacent corner pixels of the predetermined neighborhood of pixels around the selected pixel;
(c) determining if a black plane pixel of the selected pixel is greater than a predetermined black value threshold;
(d) determining if the first color plane pixel of the selected pixel represents a non-printing mark;
(e) determining if each black plane pixel within the predetermined neighborhood of pixels around the selected pixel is greater than a predetermined high black value threshold or less than a predetermined low black value threshold;
(f) determining if a multi-pixel dilation operation has been selected;
(g) setting the first color value to be added to the selected pixel of the first color plane to be the maximum first color plane pixel value within a predetermined neighborhood of pixels around a selected pixel when a multi-pixel dilation operation has not been selected;
(h) setting the first color value to be added to the selected pixel of the first color plane to be the maximum of either the maximum cyan plane pixel value within a predetermined neighborhood of pixels around a selected pixel or the maximum cyan plane pixel value of the four corner cyan plane pixels when a multi-pixel dilation operation has been selected; and
(i) adding the first color value to be added to the selected pixel of the first color plane, to expand the color region, when (c), (d), and (e) are satisfied.

* * * * *